(12) United States Patent
Akamatsu et al.

(10) Patent No.: US 9,219,856 B2
(45) Date of Patent: Dec. 22, 2015

(54) IMAGING CONTROL DEVICE, IMAGING APPARATUS, AND CONTROL METHOD PERFORMED BY IMAGING CONTROL DEVICE

(71) Applicant: SONY CORPORATION, Tokyo (JP)

(72) Inventors: Norihiko Akamatsu, Tokyo (JP);
Akifumi Mizukami, Kanagawa (JP);
Kenji Komori, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/419,733

(22) PCT Filed: Jun. 11, 2013

(86) PCT No.: PCT/JP2013/066074
§ 371 (c)(1),
(2) Date: Feb. 5, 2015

(87) PCT Pub. No.: WO2014/041859
PCT Pub. Date: Mar. 20, 2014

(65) Prior Publication Data
US 2015/0222806 A1    Aug. 6, 2015

(30) Foreign Application Priority Data

Sep. 11, 2012   (JP) ................................ 2012-199048

(51) Int. Cl.
*H04N 5/232* (2006.01)
*G03B 13/36* (2006.01)
*G03B 17/18* (2006.01)
(Continued)

(52) U.S. Cl.
CPC .............. *H04N 5/23212* (2013.01); *G02B 7/28* (2013.01); *G02B 7/34* (2013.01); *G02B 7/36* (2013.01); *G03B 13/36* (2013.01); *G03B 17/18* (2013.01); *G03B 17/20* (2013.01); *H04N 5/23293* (2013.01)

(58) Field of Classification Search
None
See application file for complete search history.

(56) References Cited

U.S. PATENT DOCUMENTS 6,157,782 A * 12/2000 Aoyama ........................ 396/104
6,163,653 A * 12/2000 Sato ............................. 396/121
(Continued)

FOREIGN PATENT DOCUMENTS

| JP | 2007-24941 A | 2/2007 |
|---|---|---|
| JP | 2007-179029 A | 7/2007 |

(Continued)

OTHER PUBLICATIONS

International Search Report issued Sep. 24, 2013 in PCT/JP2013/066074.

*Primary Examiner* — Michael Osinski
(74) *Attorney, Agent, or Firm* — Oblon, McClelland, Maier & Neustadt, L.L.P.

(57) ABSTRACT

The present technology is provided to allow a user to easily recognize a subject to be given priority.
A focusing target selection unit selects, from among a plurality of first focus detection areas in which a focus is detected by a first focus detection unit, an area to be focused as a focusing target area on the basis of a detected result of the focus in the first focus detection areas. A display area selection unit selects, from among a plurality of second focus detection areas in which a focus is detected by a second focus detection unit, an area to be displayed as a display area along with the focusing target area on the basis of a detected result of the focus in the plurality of second focus detection areas. A display control unit causes a display unit to display the display area.

9 Claims, 12 Drawing Sheets

(51) Int. Cl.
*G02B 7/28* (2006.01)
*G02B 7/34* (2006.01)
*G02B 7/36* (2006.01)
*G03B 17/20* (2006.01)

(56) References Cited

U.S. PATENT DOCUMENTS

| | | | |
|---|---|---|---|
| 6,670,992 B2* | 12/2003 | Irie | 348/350 |
| 7,046,290 B2* | 5/2006 | Nozaki | 348/350 |
| 7,515,197 B2* | 4/2009 | Suzuki | 348/345 |
| 7,706,675 B2* | 4/2010 | Nozaki et al. | 396/123 |
| 7,734,166 B2* | 6/2010 | Hamamura et al. | 396/104 |
| 7,978,254 B2* | 7/2011 | Katsumata | 348/345 |
| 8,009,976 B2* | 8/2011 | Nozaki et al. | 396/123 |
| 8,265,475 B2* | 9/2012 | Maeda | 396/124 |
| 8,390,730 B2* | 3/2013 | Takada et al. | 348/349 |
| 8,525,921 B2* | 9/2013 | Kosaka | 348/349 |
| 8,605,942 B2* | 12/2013 | Takeuchi | 382/103 |
| 8,711,274 B2* | 4/2014 | Takanashi | 348/349 |
| 2003/0052988 A1* | 3/2003 | Kurosawa | 348/360 |
| 2005/0012833 A1* | 1/2005 | Yokota et al. | 348/240.99 |
| 2005/0140815 A1* | 6/2005 | Nakano et al. | 348/345 |
| 2005/0179780 A1* | 8/2005 | Kikkawa et al. | 348/207.99 |
| 2006/0002698 A1* | 1/2006 | Terayama | 396/123 |
| 2006/0081760 A1* | 4/2006 | Kikuchi | 250/201.5 |
| 2006/0165403 A1* | 7/2006 | Ito | 396/123 |
| 2006/0290932 A1* | 12/2006 | Kawanami | 356/370 |
| 2007/0122137 A1 | 5/2007 | Ohnishi | |
| 2007/0160359 A1* | 7/2007 | Imamura | 396/238 |
| 2007/0206937 A1* | 9/2007 | Kusaka | 396/89 |
| 2007/0206940 A1 | 9/2007 | Kusaka | |
| 2007/0263997 A1* | 11/2007 | Hirai et al. | 396/123 |
| 2007/0269197 A1* | 11/2007 | Ide et al. | 396/125 |
| 2008/0166116 A1* | 7/2008 | Tsuchiya | 396/89 |
| 2009/0022486 A1* | 1/2009 | Muramatsu | 396/104 |
| 2009/0109322 A1* | 4/2009 | Ohnishi | 348/345 |
| 2009/0129766 A1* | 5/2009 | Kikuchi et al. | 396/123 |
| 2009/0147123 A1* | 6/2009 | Fujii | 348/333.12 |
| 2009/0262233 A1* | 10/2009 | Nagahata et al. | 348/341 |
| 2010/0027983 A1* | 2/2010 | Pickens et al. | 396/125 |
| 2010/0097513 A1* | 4/2010 | Takada et al. | 348/333.03 |
| 2010/0165175 A1* | 7/2010 | Deng et al. | 348/345 |
| 2010/0214407 A1* | 8/2010 | Abe | 348/135 |
| 2011/0096204 A1* | 4/2011 | Katsumata | 348/240.99 |
| 2011/0134311 A1* | 6/2011 | Nagao | 348/349 |
| 2011/0199506 A1* | 8/2011 | Takamiya | 348/222.1 |
| 2011/0200315 A1 | 8/2011 | Maeda | |
| 2011/0228146 A1* | 9/2011 | Yamamoto | 348/252 |
| 2011/0267532 A1* | 11/2011 | Sakurai | 348/345 |
| 2011/0292276 A1* | 12/2011 | Terashima | 348/348 |
| 2012/0050604 A1* | 3/2012 | Hamada et al. | 348/349 |
| 2012/0147227 A1* | 6/2012 | Yoshimura et al. | 348/246 |
| 2012/0162492 A1 | 6/2012 | Akamatsu et al. | |
| 2012/0212661 A1* | 8/2012 | Yamaguchi et al. | 348/346 |
| 2012/0301125 A1* | 11/2012 | Ashida | 396/95 |
| 2012/0314117 A1* | 12/2012 | Irie | 348/333.02 |
| 2013/0002884 A1* | 1/2013 | Nakagawara | 348/169 |
| 2013/0045001 A1* | 2/2013 | Hara | 396/378 |
| 2013/0250157 A1* | 9/2013 | Yoshida | 348/333.01 |
| 2013/0265482 A1* | 10/2013 | Funamoto | 348/349 |
| 2013/0265484 A1* | 10/2013 | Hasegawa | 348/349 |
| 2013/0335614 A1* | 12/2013 | Ichimiya | 348/333.11 |
| 2014/0071318 A1* | 3/2014 | Akamatsu et al. | 348/294 |
| 2015/0181106 A1* | 6/2015 | Komori et al. | 348/349 |

FOREIGN PATENT DOCUMENTS

| | | |
|---|---|---|
| JP | 2010-139563 A | 6/2010 |
| JP | 2011-164543 A | 8/2011 |
| JP | 2012-137600 A | 7/2012 |

* cited by examiner

FIG. 5
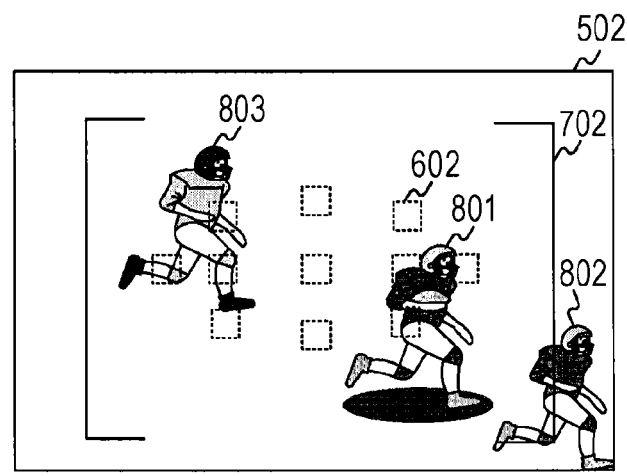
a
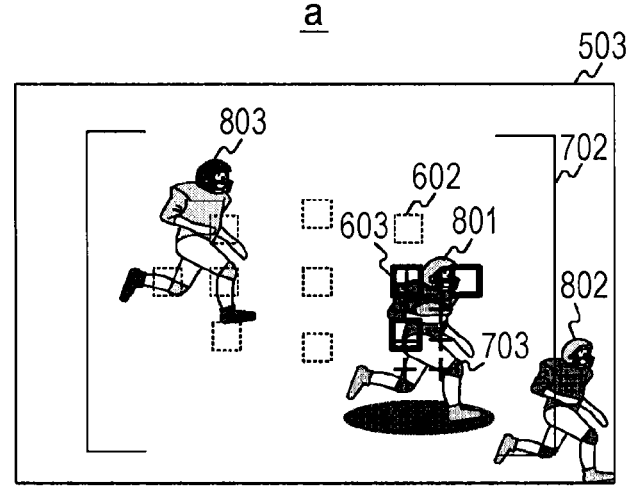
b
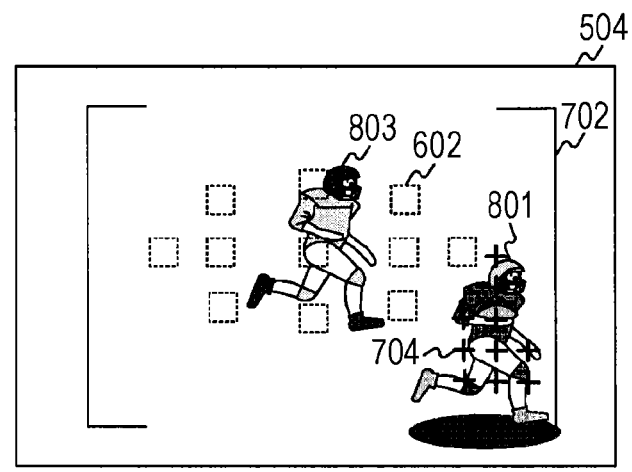
c

FIG. 11
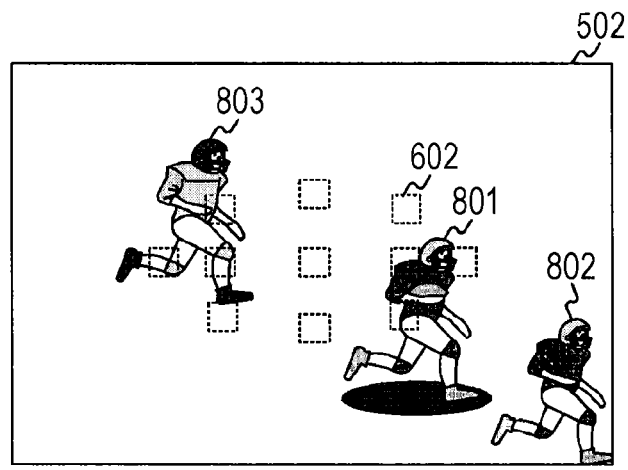
a
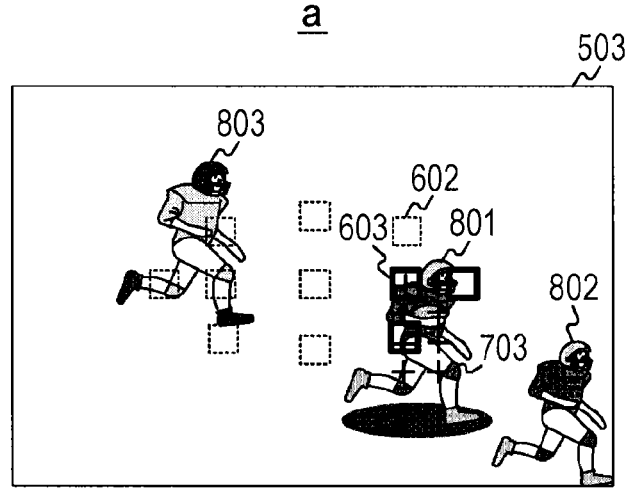
b
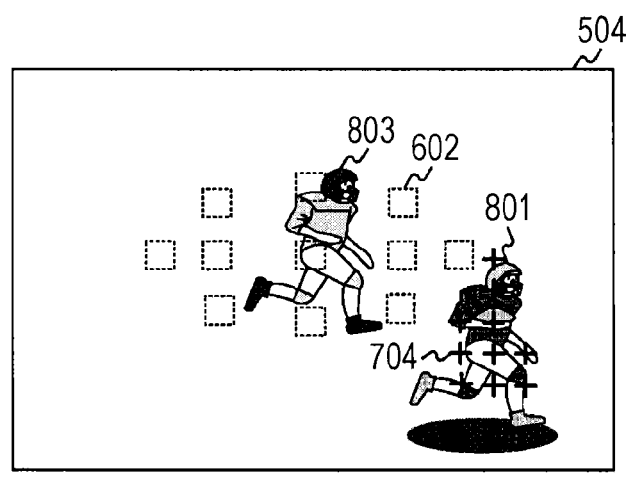
c

FIG. 12
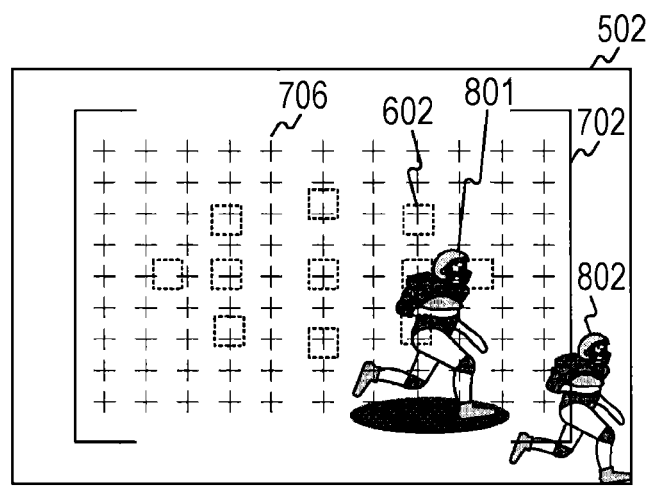
a
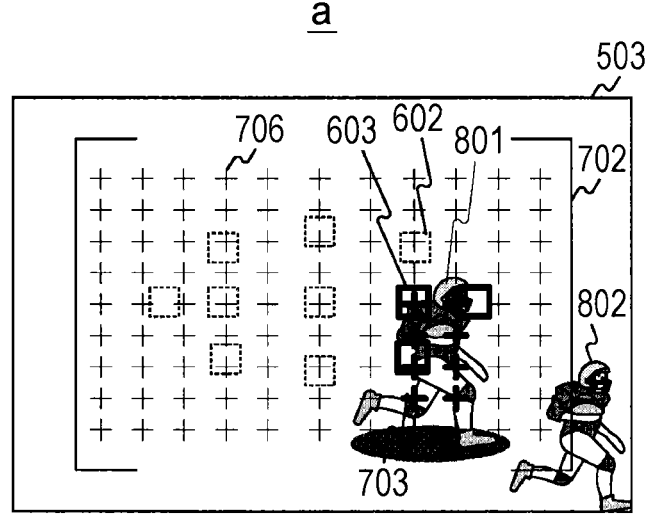
b

IMAGING CONTROL DEVICE, IMAGING APPARATUS, AND CONTROL METHOD PERFORMED BY IMAGING CONTROL DEVICE

TECHNICAL FIELD

The present technology relates to an imaging control device, an imaging apparatus, and a control method performed by the imaging control device. Specifically, the present technology relates to an imaging control device having a function to automatically focus on a subject, an imaging apparatus, and a control method performed by the imaging control device.

BACKGROUND ART

A conventional imaging apparatus is often equipped with a function, a so-called AF (Auto Focus) function, to automatically focus on a subject. The AF function is implemented by using a contrast detection method or a phase difference detection method. The contrast detection method is a method of focusing by controlling the position of a lens to a position where an image has the highest contrast. On the other hand, the phase difference detection method is a method of focusing by detecting an amount of deviation between two pupil-divided images as a phase difference and controlling the position of a lens according to the phase difference.

The phase difference detection method uses a dedicated AF module which receives pupil-divided light outside an imaging device or a phase difference pixel which receives the pupil-divided light on the imaging device. The dedicated AF module generally detects a focus more accurately than the phase difference pixel does. Moreover, an area in which the focus is detected in the phase difference pixel (hereinafter referred to as an "image surface AF area") is usually disposed larger in number than an area in which the focus is detected by the dedicated AF module (hereinafter referred to as a "dedicated AF area"). There has been proposed an imaging apparatus which includes both the dedicated AF module and the phase difference pixel and focuses on each of the dedicated AF area and the image surface AF area (refer to Patent Document 1, for example). The imaging apparatus obtains focus in each of the dedicated AF area and the image surface AF area and displays, in a finder, an AF area that is in focus.

CITATION LIST

Patent Document

Patent Document 1: JP 2007-233035 A

SUMMARY OF THE INVENTION

Problems to be Solved by the Invention

However, there is a possibility with the aforementioned imaging apparatus that a user finds it more difficult to recognize a subject to be given priority. When the imaging apparatus focuses on both the dedicated AF area and the image surface AF area that are at a distance and separately displays the AF area of those areas, for example, the user possibly finds it more difficult to recognize which area is to be given priority for imaging. Normally, the dedicated AF area having higher accuracy and sensitivity is to be given priority over the image surface AF area but, when the user does not recognize such priority, he/she finds it difficult to determine a subject of which AF area is to be prioritized.

The present technology has been made in consideration of such circumstances, where an object of the present technology is to allow the user to easily recognize a subject to be prioritized.

Solutions to Problems

A first aspect of the present technology provided to solve the aforementioned problems is an imaging control device and a control method performed thereby, the imaging control device including: a focusing target selection unit which selects, from among a plurality of first focus detection areas in which a focus is detected by a first focus detection unit, an area to be focused as a focusing target area on the basis of a detected result of the focus in the first focus detection areas; a display area selection unit which selects, from among a plurality of second focus detection areas in which a focus is detected by a second focus detection unit, an area to be displayed as a display area along with the focusing target area on the basis of a detected result of the focus in the plurality of second focus detection areas; and a display control unit which causes a display unit to display the display area. This produces an effect that the second focus detection area selected as the display area along with a first focusing target area on the basis of the detected result of the focus in the second focus detection areas is displayed along with the first focusing target area.

Moreover, in the first aspect, the focusing target area selection unit may select, as the focusing target area, an area to be focused from among the plurality of second focus detection areas on the basis of the detected result of the focus in the second focus detection unit when the focus is not detected in any of the plurality of first focus detection areas and, when the second focusing target area is selected as the focusing target area, the display control unit may select the focusing target area as the display area. This produces an effect that the second focusing target area is selected as the display area when the second focus detection area is selected as the second focusing target area.

Moreover, in the first aspect, the display control unit may further display an area not corresponding to the focusing target area among the plurality of first focus detection areas as a non-focusing target area. This produces an effect that the area not corresponding to the first focusing target area among the plurality of first focus detection areas is displayed as the non-focusing target area.

Moreover, in the first aspect, the display control unit may further display at least a part of a frame enclosing all of the plurality of second focus detection areas. This produces an effect that at least apart of the frame enclosing all of the plurality of second focus detection areas is further displayed.

Moreover, in the first aspect, there may be further provided a defocus amount acquisition unit which acquires, as a defocus amount, an amount of deviation of the focus detected by the second focus detection unit in the selected second focus detection area, where the display area selection unit may select the second focus detection area, the defocus amount of which is less than a predetermined threshold, as the display area along with the focusing target area. This produces an effect that the second focus detection area, the defocus amount of which is less than the predetermined threshold, is selected as the display area.

Moreover, in the first aspect, the first focus detection unit may detect a focus more accurately than the second focus detection unit does. This produces an effect that the focus is detected more accurately by the first focus detection unit than by the second focus detection unit.

Moreover, in the first aspect, there may be further provided a focusing unit which performs a focusing operation in the first focusing target area. This produces an effect that the focusing operation is performed in the first focusing target area.

A second aspect of the present technology is an imaging apparatus including: a first focus detection unit which detects a focus in a plurality of first focus detection areas; a second focus detection unit which detects a focus in a plurality of second focus detection areas; a focusing target selection unit which selects, from among the plurality of first focus detection areas, an area to be focused as a focusing target area on the basis of a detected result of the focus in the first focus detection areas; a display area selection unit which selects, from among the plurality of second focus detection areas, an area to be displayed as a display area along with the focusing target area on the basis of a detected result of the focus in the plurality of second focus detection areas; a display control unit which causes a display unit to display the display area along with the focusing target area; and an imaging unit which images an image including the display area. This produces an effect that the second focus detection area which is within a fixed distance from the first focus detection area selected as the area to be focused is displayed as the focusing target area along with the first focus detection area.

Effects of the Invention

The present technology can produce the superior effect that the user can easily recognize the subject to be given priority.

BRIEF DESCRIPTION OF DRAWINGS

FIGS. 5(a) to 5(c) are diagrams each illustrating an example of a screen displaying the dedicated AF area and the image surface AF area according to the first embodiment.

FIGS. 11(a) to 11(c) are diagrams each illustrating an example of a screen displaying the dedicated AF area and the image surface AF area according to the variation.

FIGS. 12(a) and 12(b) are diagrams each illustrating an example of a screen displaying a dedicated AF area and an image surface AF area according to a second embodiment.

MODES FOR CARRYING OUT THE INVENTION

Modes for carrying out the present technology (hereinafter referred to as embodiments) will be described below. The description will be given in the following order.

1. First embodiment (example of displaying a dedicated AF area in focus and an image surface AF area in the vicinity thereof)

2. Second embodiment (example of displaying a dedicated AF area in focus and an AF area not in focus with an image surface AF area in the vicinity of the dedicated AF area)

1. First Embodiment

[Configuration Example of Imaging Apparatus]

Figure 1:
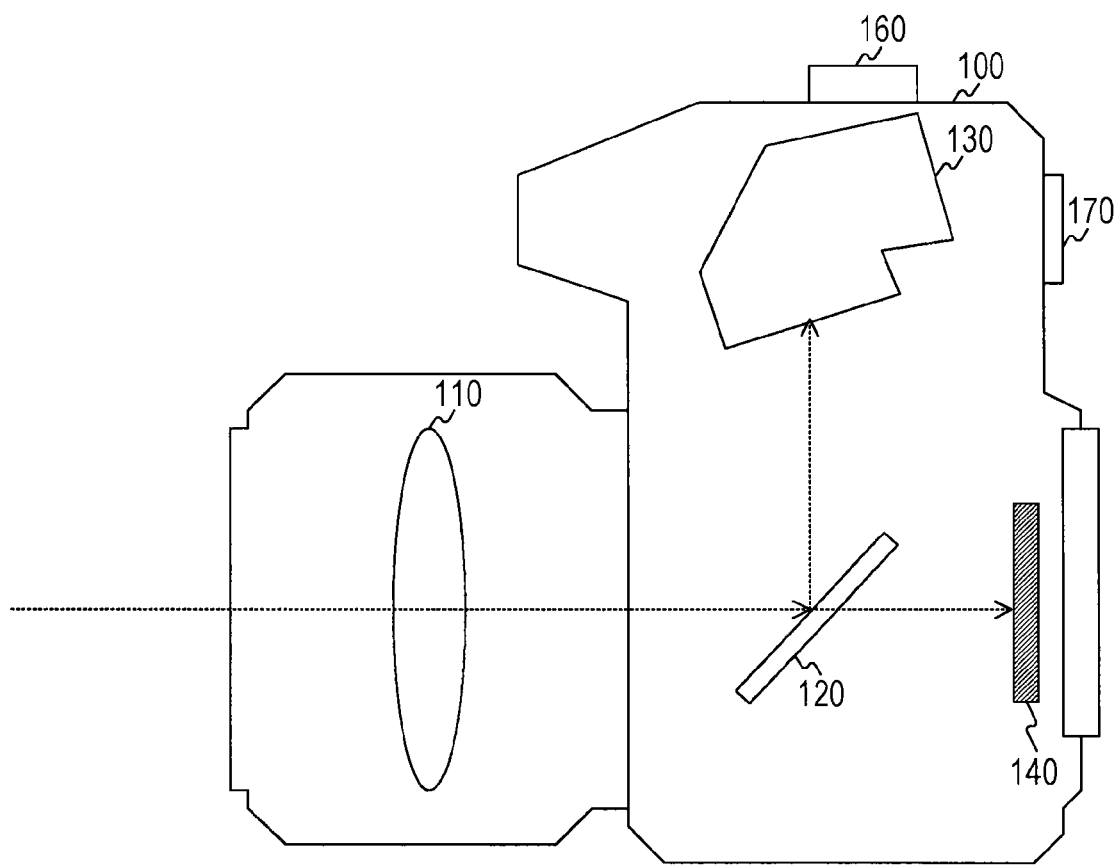
FIG. 1 is an example of a cross-sectional view of an imaging apparatus according to a first embodiment.

FIG. 1 is a diagram illustrating an example of a cross-sectional view of an imaging apparatus 100 according to an embodiment. The imaging apparatus 100 is an apparatus adapted to image an image and includes an imaging lens 110, a fixed half mirror 120, a dedicated AF module 130, an imaging device 140, an operation unit 160, and a display unit 170.

The imaging lens 110 is a lens capable of adjusting a focus. A zoom lens equipped with a focusing lens is used as the imaging lens 110, for example. The focus is adjusted by controlling the position of the focusing lens.

The fixed half mirror 120 is a semi-transmissive mirror which transmits a portion of light from the imaging lens 110 to be made incident to the imaging device 140 and reflects the remaining portion of the light to be made incident to the dedicated AF module 130.

The dedicated AF module 130 is adapted to detect a phase difference between two images subjected to pupil division by a separator lens or the like. The dedicated AF module 130 computes a degree of correlation between the two pupil-divided images when one of the images is deviated from another one of the images by various amounts of image deviation. The dedicated AF module 130 detects the amount of image deviation yielding the highest degree of correlation between the images as the phase difference. Note that the dedicated AF module 130 is an example of a first focus detection unit described in claims.

The imaging device 140 is adapted to convert the amount of light received through the imaging lens 110 and the fixed half mirror 120 into an electrical potential and output the electrical potential. The imaging device 140 includes a plurality of normal pixels and a plurality of phase difference pixels. The phase difference pixels are pixels that detect the phase difference by a method similar to that employed by the dedicated AF module. The normal pixel is a pixel used to generate an image and outputs the electrical potential according to the amount of light as a pixel value. Note that the phase difference pixel is an example of a second focus detection unit described in claims.

In general, the dedicated AF module 130 has a wider range of detecting a defocus amount as well as higher sensitivity and focus detection accuracy compared to the phase difference pixel. The dedicated AF module 130 is therefore preferentially used at the time of focusing.

The operation unit 160 includes a shutter button and a touch panel and is adapted to generate an operation signal in response to an operation of the shutter button and the touch panel performed by a user.

The display unit 170 is adapted to display an image generated by the imaging device 140. The display unit 170 includes an electric view finder (EVF), for example, and displays on the EVF a plurality of dedicated AF areas and a plurality of image surface AF areas in addition to an image. Here, the dedicated AF area is an area in which a focus is detected by the dedicated AF module 130. The image surface AF area is an area in which a focus is detected in the phase difference pixel. Each of the dedicated AF areas is assigned a piece of identification information which identifies an individual AF area. Likewise, each of the image surface AF areas is assigned a piece of identification information.

Figure 2:
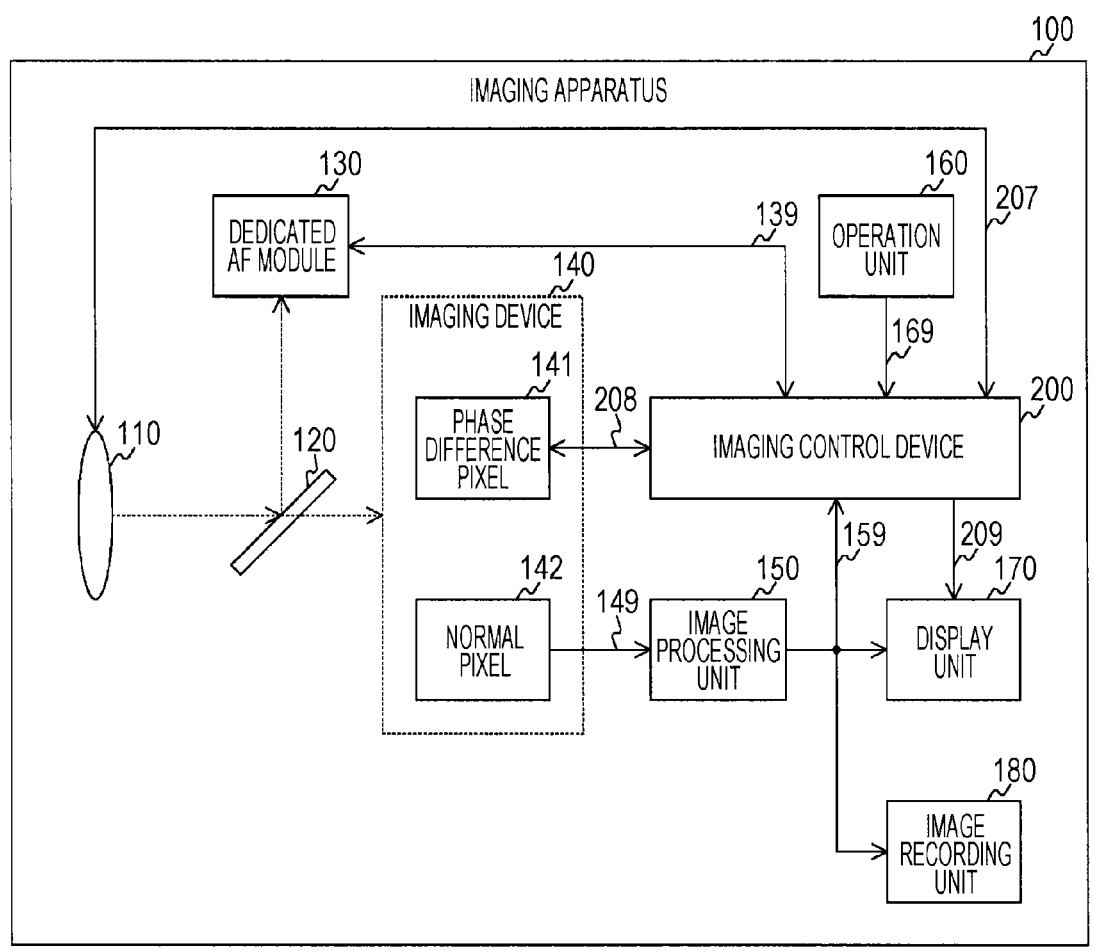
FIG. 2 is a block diagram illustrating an example of a configuration of the imaging apparatus according to the first embodiment.

FIG. 2 is a block diagram illustrating an example of a configuration of the imaging apparatus 100 according to the first embodiment. The imaging apparatus 100 includes an image processing unit 150, an image recording unit 180, and an imaging control device 200 in addition to the imaging lens 110, the fixed half mirror 120, the dedicated AF module 130, the imaging device 140, the operation unit 160, and the display unit 170 illustrated in FIG. 1. The imaging device 140 includes a phase difference pixel 141 and a normal pixel 142.

The image processing unit 150 is adapted to perform image processing such as mosaic processing and white balance processing on image data that is generated by the pixel value of the normal pixel 142. The image processing unit 150 receives the pixel value from the normal pixel 142 through a signal line 149 and holds the image data generated by the pixel value. The image processing unit 150 then interpolates a pixel corresponding to the phase difference pixel 141 in the image being held. Thereafter, the image processing unit 150 performs the image processing such as the mosaic processing and the white balance processing on the interpolated image data as needed and outputs the data to the display unit 170, the image recording unit 180, and the imaging control device 200 through a signal line 159.

The imaging control device 200 is adapted to control the entire imaging apparatus 100. The imaging apparatus 100 executes focusing processing to obtain focus according to the operation signal received from the operation unit 160 through a signal line 169. In the focusing processing, the imaging control device 200 controls the dedicated AF module 130 and the phase difference pixel 141 through signal lines 139 and 208 to start detecting the phase difference. The imaging control device 200 then multiplies the detected phase difference by a predetermined conversion factor and calculates the defocus amount that is the amount of deviation of the focus.

Moreover, the imaging control device 200 receives the image data from the image processing unit 150 and recognizes a subject in the image data. The imaging control device 200 recognizes a person or an object as the subject by employing a template matching method, for example, where a template image of a search target is moved within the image data for comparison. Alternatively, the imaging control device 200 employs an inter-frame difference method of detecting a mobile object by finding the difference between two successive images and recognizes the mobile object as the subject. Note that the imaging control device 200 can recognize the subject by another method as well. The imaging control device 200 may recognize a skin-colored area as an area corresponding to a person being the subject, for example.

After recognizing the subject, the imaging control device 200 determines any of the subjects, at least a part of which overlaps with the dedicated AF area, as the subject that is a tracking target to be kept in focus. The imaging control device 200 continues to track the subject being the tracking target when the tracking target moves within a screen. A method of determining the tracking target and a tracking method will be described in detail later on. When the subject being the tracking target is not outside the dedicated AF area with at least a part of the subject overlapping with the dedicated AF area, the imaging control device 200 selects the dedicated AF area as an AF target area. The AF target area is an area to be brought into focus. When the subject being the tracking target moves and does not overlap with the dedicated AF area, on the other hand, the imaging control device 200 selects, as the AF target area, the image surface AF area which overlaps with at least a part of the subject.

After selecting the AF target area, the imaging control device 200 controls the position of the focusing lens of the imaging lens 110 through a signal line 207. Specifically, the imaging control device 200 controls the position of the focusing lens of the imaging lens 110 to a position where the defocus amount in the AF target area is less than a predetermined threshold. The AF target area is brought into focus as a result. After the AF target area is brought into focus, the imaging control device 200 controls the display unit 170 through a signal line 209 to display the dedicated AF area or image surface AF area in focus.

After the AF target area is brought into focus, the imaging control device 200 executes imaging processing of recording the image data in the image recording unit 180 according to the operation signal from the operation unit 160.

[Configuration Example of Imaging Control Device]

Figure 3:
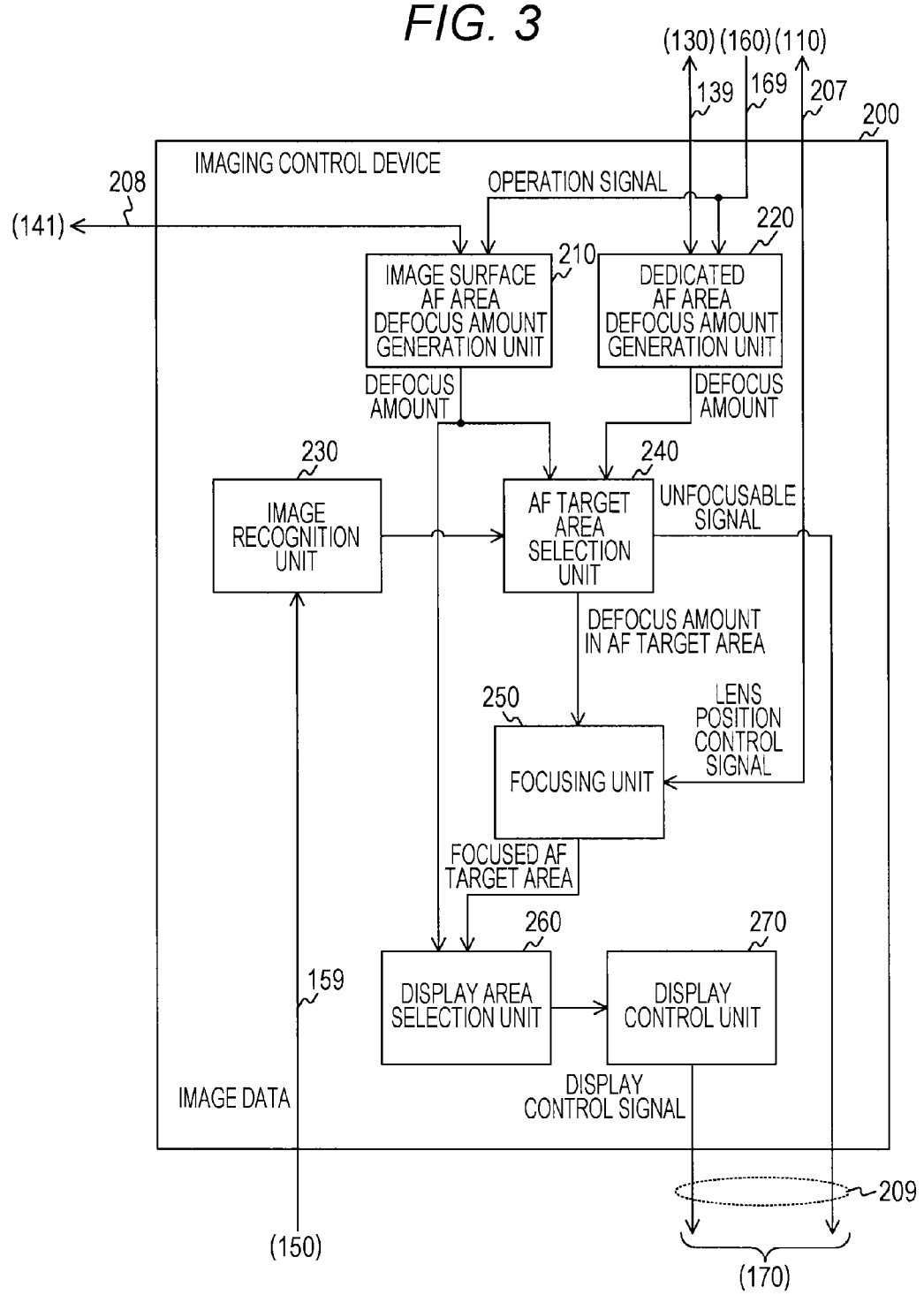
FIG. 3 is a block diagram illustrating an example of a configuration of an imaging control device according to the first embodiment.

FIG. 3 is a block diagram illustrating an example of a configuration of the imaging control device 200 according to the first embodiment. The imaging control device 200 includes an image surface AF area defocus amount generation unit 210, a dedicated AF area defocus amount generation unit 220, an image recognition unit 230, an AF target area selection unit 240, and a focusing unit 250. The imaging control device 200 further includes a display area selection unit 260 and a display control unit 270.

The image surface AF area defocus amount generation unit 210 is adapted to generate the defocus amount from the amount of image deviation, namely the phase difference, detected in the phase difference pixel 141. The image surface AF area defocus amount generation unit 210 starts detecting the phase difference in each image surface AF area according to the operation signal from the operation unit 160. Once each phase difference is detected, the image surface AF area defocus amount generation unit 210 multiplies the phase difference by a predetermined conversion factor to generate the defocus amount in each image surface AF area. The image surface AF area defocus amount generation unit 210 then supplies the generated defocus amount to the AF target area selection unit 240 and the display area selection unit 260.

The dedicated AF area defocus amount generation unit 220 is adapted to generate the defocus amount from the phase difference detected by the dedicated AF module 130. The dedicated AF area defocus amount generation unit 220 causes the dedicated AF module 130 to start detecting the phase difference in each dedicated AF area according to an operation signal from the operation unit 160, the operation signal being generated in response to an operation to start focusing. The operation to start focusing is an operation of pressing the shutter button halfway or all the way down, for example. Once each phase difference is detected, the dedicated AF area defocus amount generation unit 220 multiplies the phase difference by a predetermined conversion factor to generate the defocus amount in each dedicated AF area. The dedicated AF area defocus amount generation unit 220 then supplies the generated defocus amount to the AF target area selection unit 240.

The image recognition unit 230 is adapted to receive the image data from the image processing unit 150 and recognize the subject in the image data. The image recognition unit 230 recognizes a person or an object as the subject by employing the template matching method, for example, where a template image of a search target is moved within the image data for comparison. Alternatively, the imaging control device 200 employs the inter-frame difference method of detecting a mobile object by finding the difference between two successive images and recognizes the mobile object as the subject.

The AF target area selection unit 240 is adapted to select the AF target area from between the dedicated AF area and the image surface AF area. The AF target area selection unit 240 receives the defocus amount from the image surface AF area defocus amount generation unit 210 and the dedicated AF area defocus amount generation unit 220. The AF target area selection unit 240 then determines whether or not any of the AF areas can be brought into focus on the basis of the defocus amount. When a drive range of the focusing lens is limited in order to cut down a release time lag, for example, a focus position corresponding to the detected defocus amount sometimes corresponds to a position where the focusing lens cannot be driven. In such case, the AF target area selection unit 240 determines that focusing cannot be obtained. When focusing cannot be obtained, the AF target area selection unit 240 outputs to the display unit 170 an unfocusable signal which makes a user recognize that focusing cannot be obtained. The unfocusable signal is a signal provided to control the display unit 170 to not display the AF area, for example.

When focusing can be obtained, the AF target area selection unit 240 receives a recognition result of the subject from the image recognition unit 230. The AF target area selection unit 240 then determines any of the subjects, at least a part of which overlaps with the dedicated AF area, as the tracking target from among the subjects recognized on the basis of the recognition result. The closest subject based on the defocus amount in the dedicated AF area is determined to be the tracking target, for example.

Here, the distance to the subject is obtained from the defocus amount. This is because an absolute value of the defocus amount gets larger as the position of the subject in the depth direction gets closer or farther to/from a position in focus. One can determine from a sign of the defocus amount whether the subject is closer or farther to/from the position in focus. The sign of the defocus amount when the subject is close to the position in focus is determined to be positive or negative depending on which of the two images is used as a reference in detecting the amount of image deviation.

After the defocus amount of the subject being the tracking target falls below the threshold, the AF target area selection unit 240 continues to focus on the tracking target, even when the tracking target moves, by changing the AF target area according to the move. The AF target area selection unit 240 obtains the defocus amount in the dedicated AF area and the image surface AF area, for example. The AF target area selection unit 240 then employs a background difference method or the inter-frame difference method to detect a mobile object and a move amount thereof. The AF target area selection unit 240 determines the subject with the smallest defocus amount among the detected mobile objects to be the subject being the tracking target. The degree of similarity can be found by the sum of absolute values of differences in luminance values of a pixel at the same position in a saved image and an image to be compared, for example.

Upon capturing the subject being the tracking target, the AF target area selection unit 240 determines whether or not there is a dedicated AF area which overlaps with at least a part of the subject. When there exists the dedicated AF area which overlaps with at least a part of the subject, the AF target area selection unit 240 selects the dedicated AF area as the AF target area.

When the subject being the tracking target does not overlap with the dedicated AF area, namely when the tracking target moves outside the dedicated AF area, the AF target area selection unit 240 selects an image surface AF area which overlaps with at least a part of the subject as the AF target area. The AF target area selection unit 240 acquires identification information of the selected AF target area and supplies it to the focusing unit 250 along with the defocus amount of the AF target area. Note that the AF target area selection unit is an example of a focusing target area selection unit described in claims.

The focusing unit 250 is adapted to perform focusing in the selected AF target area. The focusing unit 250 determines whether or not the defocus amount from the AF target area selection unit 240 is less than the threshold. When the defocus amount is not less than the threshold, the focusing unit 250 outputs to the imaging lens 110 a lens position control signal provided to control the position of the focusing lens to a position where the defocus amount is less than the threshold. On the other hand, when the defocus amount is less than the threshold, namely when the AF target area is brought into focus, a piece of identification information identifying the AF target area is supplied to the display area selection unit 260 and the display control unit 270.

The display area selection unit 260 is adapted to select an area to be displayed among the image surface AF areas as a display area on the basis of the defocus amount in the image surface AF areas. The display area selection unit 260, when the dedicated AF area is brought into focus, the image surface AF area display control unit 260 receives the defocus amount from the image surface AF area defocus amount generation unit 210. The defocus amount in the image surface AF area is acquired so that one can determine which image surface AF area is brought into focus when the dedicated AF area is brought into focus. The image surface AF area display control unit 260 then selects an image surface AF area, which is within a fixed distance from the dedicated AF area corresponding to the AF target area and has the defocus amount less than the threshold, as the display area along with an AF target area. When the image surface AF area is brought into focus, on the other hand, the display area selection unit 260 selects the image surface AF area as the display area. The display area selection unit 260 supplies identification information of the AF area selected as the display area to the display control unit 270.

The display control unit 270 is adapted to display the display area selected by the display control unit 270 on the display unit 170.

Note that the imaging control device 200 displays the AF target area after focusing but may instead display the AF target area before focusing and perform focusing thereafter.

Figure 4:
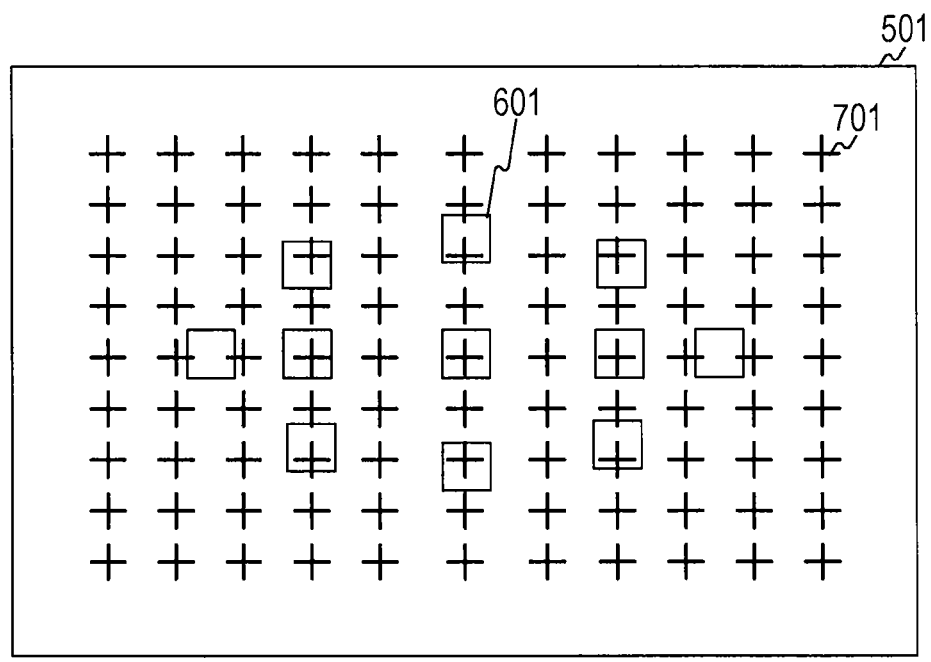
FIG. 4 is a diagram illustrating an example of arrangement of a dedicated AF area and an image surface AF area according to the first embodiment.

FIG. 4 is a diagram illustrating an example of arrangement of the dedicated AF area and the image surface AF area according to the first embodiment. The mark "☐" in FIG. 4 represents a dedicated AF area 601. The mark "+" represents an image surface AF area 701. In general, the phase difference pixel 141 can be freely arranged by the dedicated AF module 130 so that the image surface AF areas 701 larger in number than the dedicated AF areas 601 are arranged on a screen 501 within the EVF.

[Example of Operation of Imaging Apparatus]

FIGS. 5(*a*) to 5(*c*) are diagrams each illustrating an example of a screen displaying the dedicated AF area and the image surface AF area according to the first embodiment. FIG. 5(*a*) is an example of a screen 502 displaying the dedicated AF area before the AF target area is selected. Before the AF target area is selected, a dedicated AF area 602 is displayed as the mark "☐" drawn with a dotted line, for example. The image surface AF area is not displayed, but a part 702 of a frame enclosing the image surface AF area is displayed. Note that the imaging apparatus 100 may display not a part of the frame but the entire frame.

In FIG. 5(*a*), there are recognized subjects 801 and 803, at least a part of each of which overlaps with the dedicated AF area, as well as a subject 802 which does not overlap with the dedicated AF area. The imaging apparatus 100 determines the closest subject 801 between the subjects 801 and 803 as the tracking target on the basis of the defocus amount in the dedicated AF area, and selects an AF area overlapping with at least a part of the subject 801 as the AF target area.

FIG. 5(*b*) is an example of a screen 503 displaying the dedicated AF area and the image surface AF area after the AF target area is selected. A dedicated AF area 603 corresponding to the AF target area is displayed distinguishably from the dedicated AF area 602 that is not the AF target area. The dedicated AF area 603 corresponding to the AF target area is displayed as the mark "☐" drawn with a bold line, for example. Also displayed is an image surface AF area 703 which is within a fixed distance from the dedicated AF area 603 and is brought into focus.

FIG. 5(*c*) is an example of a screen 504 displaying the AF target area when the tracking target moves outside the dedicated AF area. In FIG. 5(*c*), the subject 801 being the tracking target moves outside the dedicated AF area so that the imaging apparatus 100 selects an image surface AF area 704 which at least partly overlaps with the subject 801, and displays the area. Although within the dedicated AF area, the subject 803 is not subjected to focusing since it is not determined as the tracking target in FIG. 5(*b*). Note that in FIGS. 5(*a*) to 5(*c*), the imaging apparatus 100 may display the AF area with a mark other than "☐" and "+". Moreover, the imaging apparatus 100 distinguishably displays by the type of line whether or not the area corresponds to the AF target area, but may instead display the area distinguishably by another display method. The imaging apparatus 100 may display only an area corresponding to the AF target area in a flashing manner, for example.

When the subject overlapping with the dedicated AF area and the subject overlapping only with the image surface AF are present, the dedicated AF area overlapping with the subject is preferentially displayed as the AF target area as described above. When an AF area overlapping with each subject is displayed separately, the user finds it more difficult to recognize which subject is to be given priority for imaging. The user can easily recognize the subject to be prioritized by preferentially displaying the dedicated AF area overlapping with the subject. Moreover, the user can recognize the area of the subject being the tracking target by displaying the image surface AF area in the vicinity of the dedicated AF area.

Figure 6:
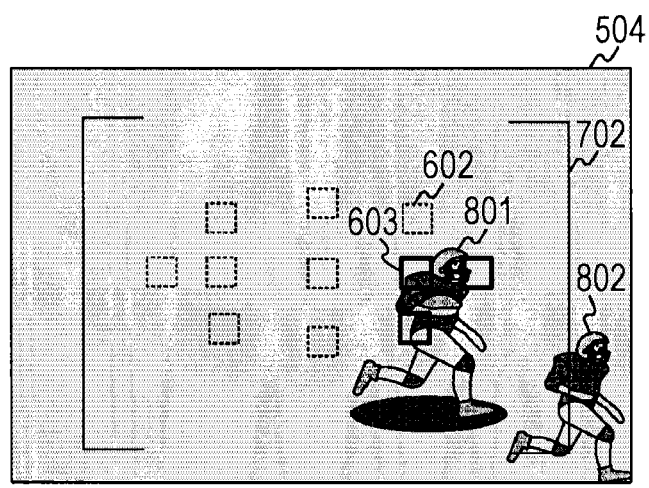
FIG. 6 is a diagram illustrating an example of a screen displaying the dedicated AF area according to the first embodiment.

FIG. 6 is a diagram illustrating an example of the screen 504 displaying the dedicated AF area according to the first embodiment. It is assumed in FIG. 6 that the brightness across the screen 504 is lower than that of each screen illustrated in FIGS. 5(*a*) to 5 (*c*). Having lower sensitivity than the dedicated AF module 130 as described above, the phase difference pixel 141 cannot detect the phase difference in some cases when the brightness is low. In this case, the defocus amount is not generated in the image surface AF area so that only the dedicated AF area 603 overlapping with at least a part of the subject 801 is displayed as the AF target area.

Figure 7:
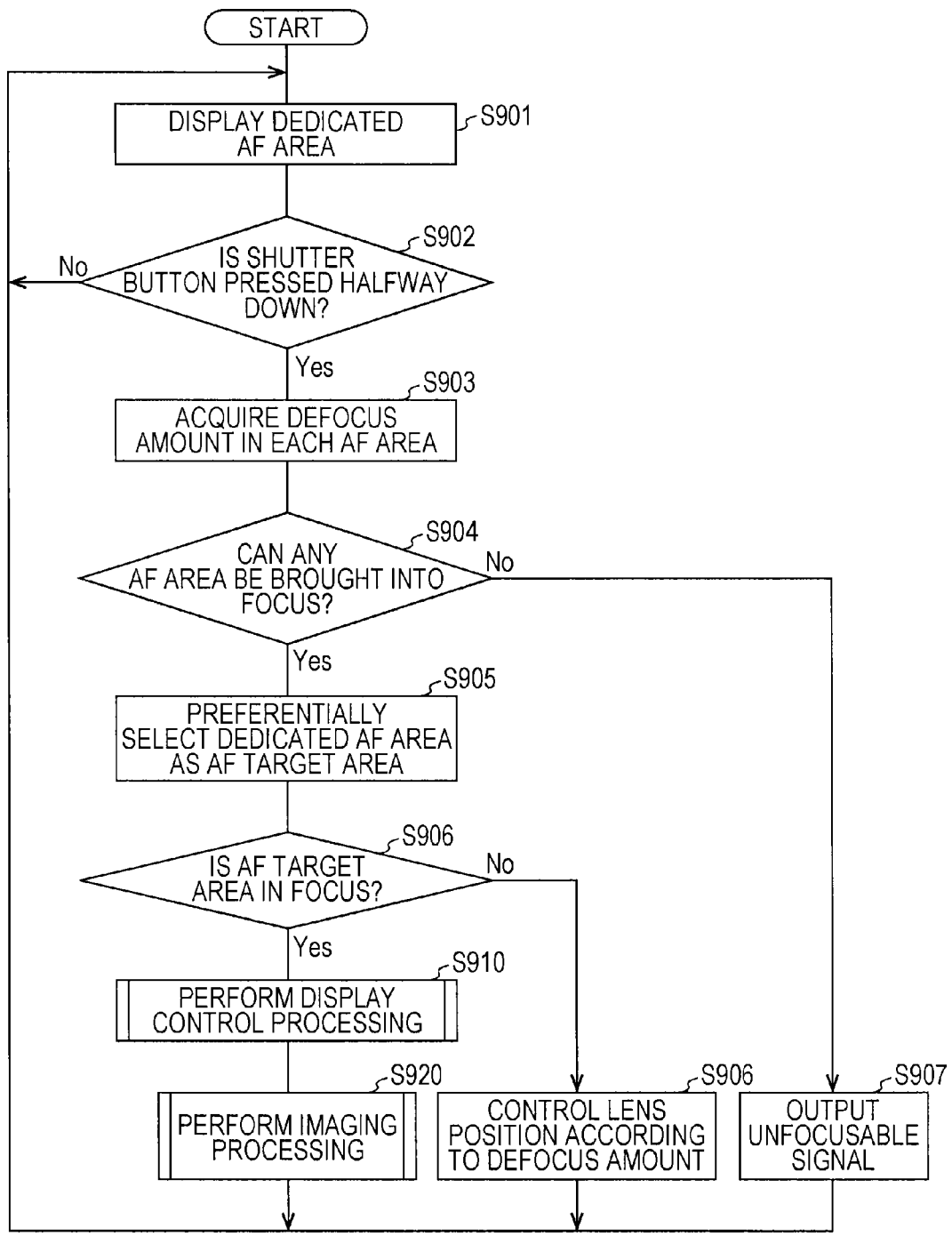
FIG. 7 is a flowchart illustrating an example of an operation of the imaging apparatus according to the first embodiment.

FIG. 7 is a flowchart illustrating an example of an operation of the imaging apparatus 100 according to the first embodiment. The operation starts when the imaging apparatus 100 is turned on, for example.

The imaging apparatus 100 displays the dedicated AF area not corresponding to the AF target area (step S901). The imaging apparatus 100 determines whether or not an instruction is given to start focusing by an operation such as the shutter button pressed halfway down (step S902). When the shutter button is not pressed halfway down (step S902: No), the imaging apparatus 100 returns to step S901.

When the shutter button is pressed halfway down (step S902: Yes), the imaging apparatus 100 acquires the defocus amount in each of the dedicated AF area and the image surface AF area (step S903). The imaging apparatus 100 then determines whether or not any of the AF areas can be brought into focus on the basis of the defocus amount (step S904). When no AF area can be brought into focus (step S904: No), the imaging apparatus 100 outputs the unfocusable signal. Moreover, the imaging apparatus 100 does not accept an operation to perform imaging such as the shutter button pressed all the way down (step S908).

When any of the AF areas can be brought into focus (step S904: Yes), the imaging apparatus 100 determines the subject being the tracking target and preferentially selects the dedicated AF area as the AF target area from among the AF areas overlapping with at least a part of the subject (step S905). The imaging apparatus 100 determines whether or not the defocus amount of the AF target area is less than the threshold, namely, whether or not the AF target area is brought into focus (step S906).

When the AF target area is brought into focus (step S906: Yes), the imaging apparatus 100 executes display control processing to display the AF area in focus (step S910) and then executes the imaging processing to perform imaging (step S920).

When the AF target area is not brought into focus (step S906: No), on the other hand, the imaging apparatus 100 controls the position of the imaging lens 110 according to the defocus amount. Moreover, the imaging apparatus 100 does not accept an operation to perform imaging (step S907). The imaging apparatus 100 returns to step S901 following step S920, S907, or S908.

Figure 8:
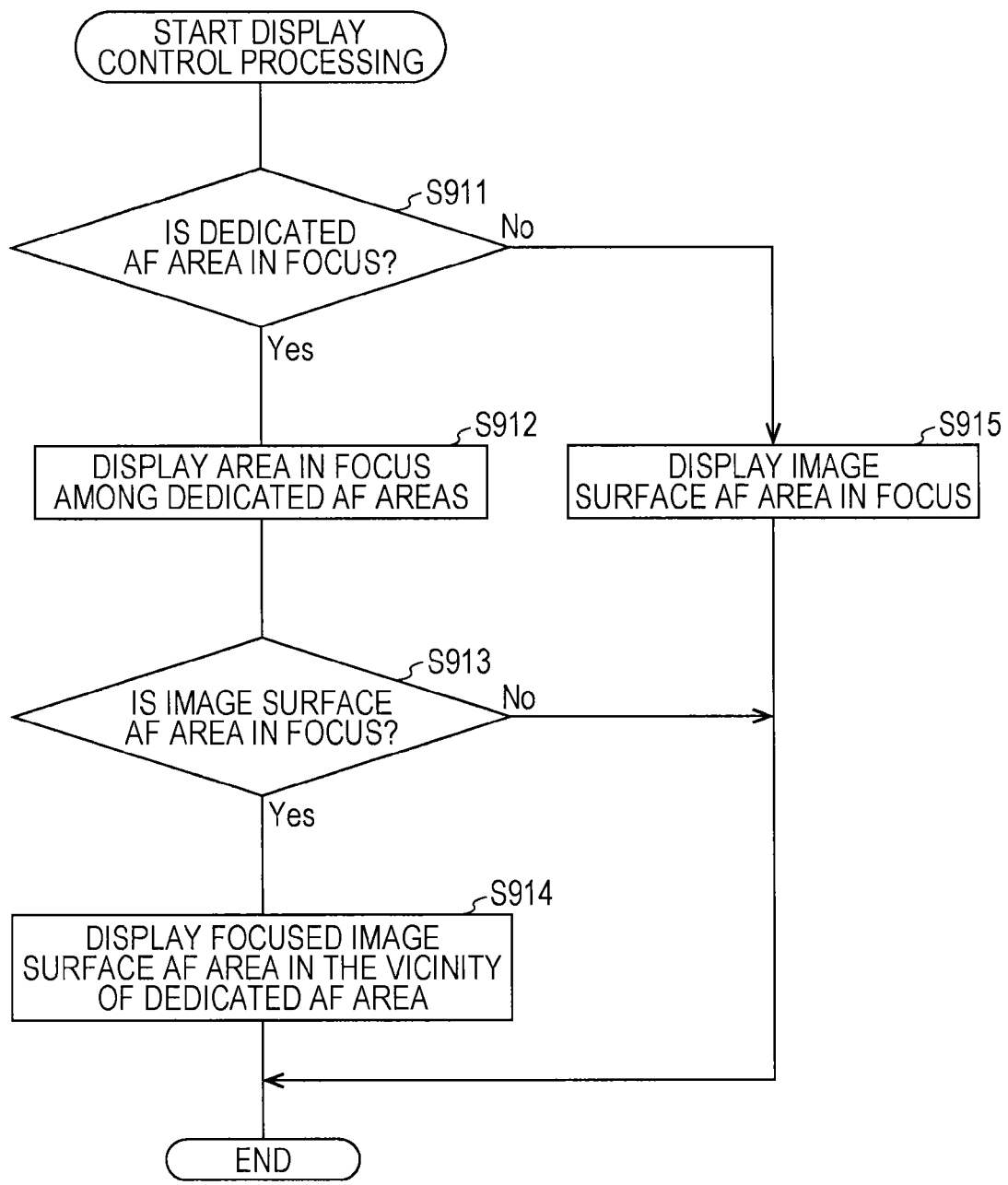
FIG. 8 is a flowchart illustrating an example of display control processing according to the first embodiment.

FIG. 8 is a flowchart illustrating an example of the display control processing according to the first embodiment. The imaging apparatus 100 determines whether or not any of the dedicated AF areas is brought into focus (step S911). When any of the dedicated AF areas is brought into focus (step S911: Yes), the imaging apparatus 100 displays the focused dedicated AF area, among the dedicated AF areas, to be distinguishable from the other dedicated AF areas (step S912). The imaging apparatus 100 then determines whether or not any of the image surface AF areas is brought into focus (step S913).

When any of the image surface AF areas is brought into focus (step S913: Yes), the imaging apparatus 100 displays the focused image surface AF area in the vicinity of the dedicated AF area (step S914).

When none of the dedicated AF areas is brought into focus (step S911: No), the imaging apparatus 100 displays the image surface AF area in focus (step S915). When none of the image surface AF areas is brought into focus (step S913: No) or following step S914 or step S915, the imaging apparatus 100 ends the display control processing.

Figure 9:
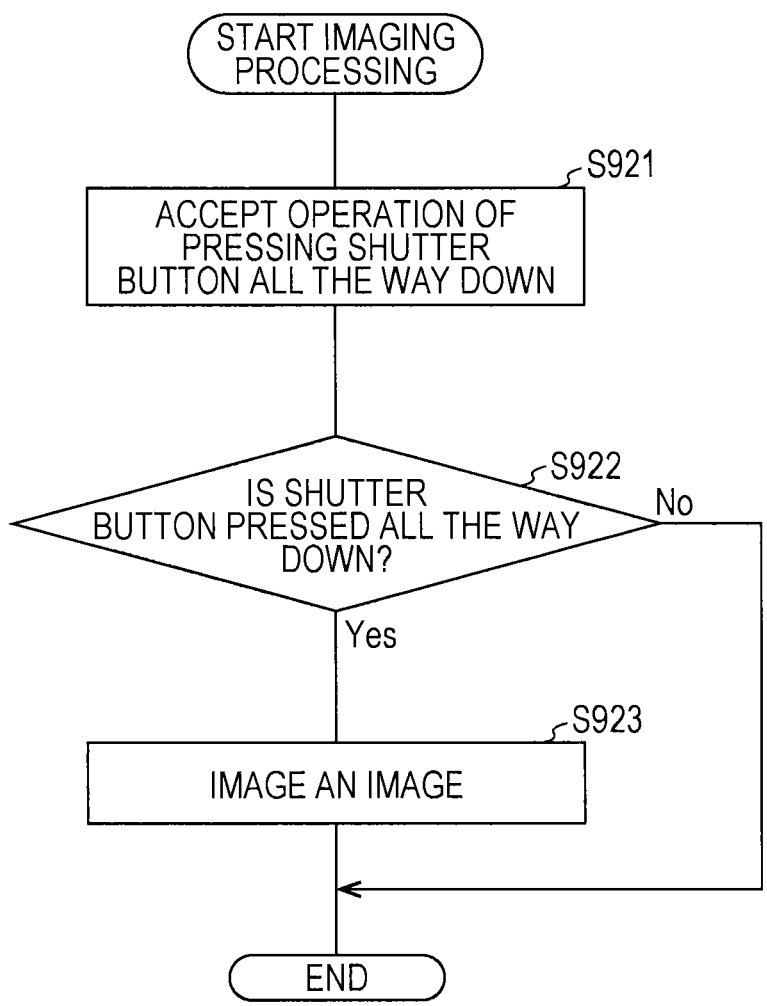
FIG. 9 is a flowchart illustrating an example of imaging processing according to the first embodiment.

FIG. 9 is a flowchart illustrating an example of the imaging processing according to the first embodiment. The imaging apparatus 100 accepts an operation to instruct imaging such as the shutter button pressed all the way down (step S921). The imaging apparatus 100 determines whether or not the instruction to perform imaging is given by the shutter button pressed all the way down or the like (step S922). When the shutter button is pressed all the way down (step S922: Yes), the imaging apparatus 100 performs imaging by recording the image data into the image recording unit 180 (step S923). When the shutter button is not pressed all the way down (step S922: No) or following step S923, the imaging apparatus 100 ends the imaging processing.

According to the first embodiment, as described above, the dedicated AF area is brought into focus so that the image surface AF area is displayed along with the dedicated AF area on the basis of the focus detection result in the image surface AF area. The AF area having higher focus detection accuracy between the dedicated AF area and the image surface AF area, namely the dedicated AF area, is displayed as a result. The user can thus easily recognize the AF area having the higher focus detection accuracy. Moreover, the user can recognize the area of the subject being the tracking target by further displaying the image surface AF area.

Figure 10:
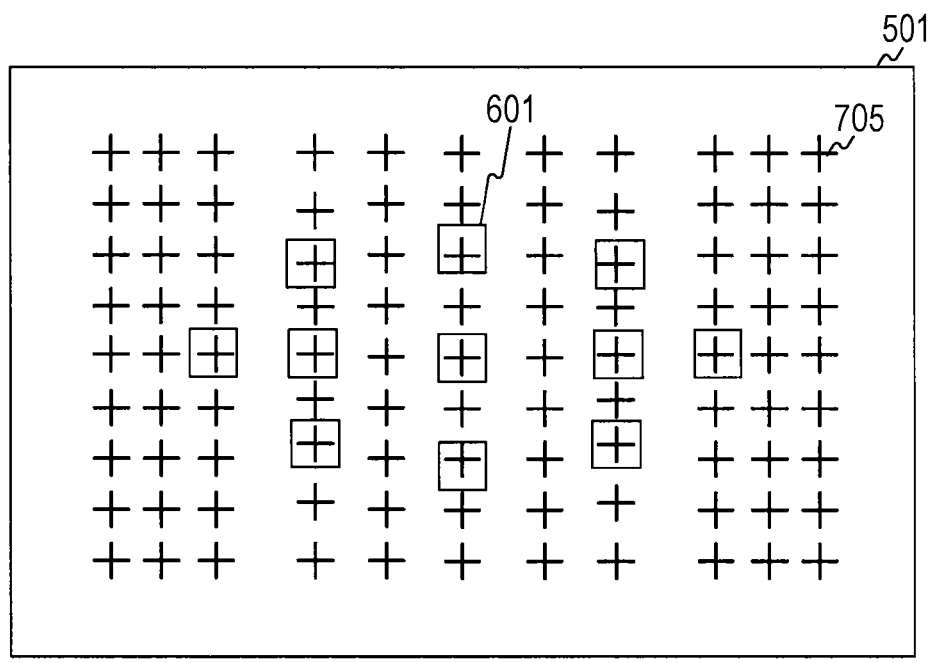
FIG. 10 is a diagram illustrating an example of arrangement of a dedicated AF area and an image surface AF area according to a variation.

Note that the arrangement of the dedicated AF area and the image surface AF area is not limited to the configuration illustrated in FIG. 4. The arrangement of the image surface AF area and the dedicated AF area may overlap as illustrated in FIG. 10, for example.

Moreover, the imaging apparatus 100 displays a part of the frame enclosing the image surface AF area as illustrated in FIGS. 5(a) to 5(c) but may be adapted to not display the frame as illustrated in FIGS. 11(a) to 11(c).

2. Second Embodiment

[Example of Operation of Imaging Apparatus]

FIGS. 12(a) and 12(b) are diagrams each illustrating an example of a screen displaying a dedicated AF area and an image surface AF area according to a second embodiment. While the imaging apparatus 100 in the first embodiment does not display the image surface AF area when the defocus amount thereof is not less than the threshold, an imaging apparatus 100 of the present embodiment can further display an image surface AF area when a defocus amount thereof is not less than a threshold. The imaging apparatus 100 according to the second embodiment is different from the first embodiment in that the image surface AF area with the defocus amount not less than the threshold is further displayed.

FIG. 12 (a) is an example displaying a dedicated AF area before an AF target area is selected. Before the AF target area is selected, an image surface AF area 706 with the defocus amount not less than the threshold is further displayed. The image surface AF area 706 with the defocus amount not less than the threshold is displayed as a mark "+" drawn with a thin line, for example.

FIG. 12(b) is an example displaying the dedicated AF area and the image surface AF area after the AF target area is selected. An image surface AF area 703 with the defocus amount not less than the threshold is displayed distinguishably from the image surface AF area 706 with the defocus amount less than the threshold. The image surface AF area 703 with the defocus amount less than the threshold is displayed as a mark "+" drawn with a thick line, for example.

According to the second embodiment as described above, the image surface AF area with the defocus amount not less than the threshold is further displayed. This allows a user to recognize a range of area in which a focus is detected so that the user can easily perform focusing.

Note that the aforementioned embodiments have been described as an example to realize the present technology where each of the matters described in the embodiments corresponds to each of the matters specifying the invention described in claims. Likewise, each of the matters specifying the invention in claims corresponds to each of the matters which are described in the embodiments of the present technology and to which the name identical to that of the matters specifying the invention is assigned. However, the present technology is not limited to the aforementioned embodiments where the present technology can be realized by making various modifications to the embodiments without departing from the scope thereof.

Note that the present technology can have the following configuration as well.

(1) An imaging control device including:
  a focusing target selection unit which selects, from among a plurality of first focus detection areas in which a focus is detected by a first focus detection unit, an area to be focused as a focusing target area on the basis of a detected result of the focus in the first focus detection areas;
  a display area selection unit which selects, from among a plurality of second focus detection areas in which a focus is detected by a second focus detection unit, an area to be displayed as a display area along with the focusing target area on the basis of a detected result of the focus in the plurality of second focus detection areas; and
  a display control unit which causes a display unit to display the display area.

(2) The imaging control device according to (1), where the focusing target area selection unit selects, as the focusing target area, an area to be focused from among the plurality of second focus detection areas on the basis of the detected result of the focus in the second focus detection unit when the focus is not detected in any of the plurality of first focus detection areas and, when the second focusing target area is selected as the focusing target area, the display control unit selects the focusing target area as the display area.

(3) The imaging control device according to (1) or (2), where the display control unit further displays an area not corresponding to the focusing target area among the plurality of first focus detection areas as a non-focusing target area.

(4) The imaging control device according to (3), where the display control unit further displays at least a part of a frame enclosing all of the plurality of second focus detection areas.

(5) The imaging control device according to any of (1) to (4), further including a defocus amount acquisition unit which acquires, as a defocus amount, an amount of deviation of the focus detected by the second focus detection unit in the selected second focus detection area,
  where the display area selection unit selects the second focus detection area, the defocus amount of which is less than a predetermined threshold, as the display area along with the focusing target area.

(6) The imaging control device according to any of (1) to (5), where the first focus detection unit detects a focus more accurately than the second focus detection unit does.

(7) The imaging control device according to any of (1) to (6), further including a focusing unit which performs a focusing operation in the first focusing target area.

(8) An imaging apparatus including: a first focus detection unit which detects a focus in a plurality of first focus detection areas;
  a second focus detection unit which detects a focus in a plurality of second focus detection areas;
    a focusing target selection unit which selects, from among the plurality of first focus detection areas, an area to be focused as a focusing target area on the basis of a detected result of the focus in the first focus detection areas;
  a display area selection unit which selects, from among the plurality of second focus detection areas, an area to be displayed as a display area along with the focusing target area on the basis of a detected result of the focus in the plurality of second focus detection areas;

a display control unit which causes a display unit to display the display area along with the focusing target area; and an imaging unit which images an image including the display area.

(9) A control method performed by an imaging control device, the method including: a focusing target selection process in which a focusing target selection unit selects, from among a plurality of first focus detection areas in which a focus is detected by a first focus detection unit, an area to be focused as a focusing target area on the basis of a detected result of the focus in the first focus detection areas;

a display area selection process in which a display area selection unit selects, from among a plurality of second focus detection areas in which a focus is detected by a second focus detection unit, an area to be displayed as a display area along with the focusing target area on the basis of a detected result of the focus in the plurality of second focus detection areas; and a display control process in which a display control unit causes a display unit to display the display area.

REFERENCE SIGNS LIST

100 Imaging apparatus
110 Imaging lens
120 Fixed half mirror
130 Dedicated AF module
140 Imaging device
141 Phase difference pixel
142 Normal pixel
150 Image processing unit
160 Operation unit
170 Display unit
180 Image recording unit
200 Imaging control device
210 Image surface AF area defocus amount generation unit
220 Dedicated AF area defocus amount generation unit
230 Image recognition unit
240 AF target area selection unit
250 Focusing unit
260 Display area selection unit
270 Display control unit

The invention claimed is:

1. An imaging control device comprising:
a focusing target selection unit which selects, from among a plurality of first focus detection areas in which a focus is detected by a first focus detection unit, an area for focusing as a focusing target area on the basis of a detected result of the focus in the first focus detection areas;
a display area selection unit which selects, from among a plurality of second focus detection areas in which a focus is detected by a second focus detection unit, an area for displaying as a display area along with the focusing target area on the basis of a detected result of the focus in the plurality of second focus detection areas; and
a display control unit which causes a display unit to display the display area.

2. The imaging control device according to claim 1, wherein
the focusing target area selection unit selects, as the focusing target area, an area for focusing from among the plurality of second focus detection areas on the basis of the detected result of the focus in the second focus detection unit when the focus is not detected in any of the plurality of first focus detection areas, and
when the second focusing target area is selected as the focusing target area, the display control unit selects the focusing target area as the display area.

3. The imaging control device according to claim 1, wherein the display control unit further displays an area not corresponding to the focusing target area among the plurality of first focus detection areas as a non-focusing target area.

4. The imaging control device according to claim 1, wherein the display control unit further displays at least a part of a frame enclosing all of the plurality of second focus detection areas.

5. The imaging control device according to claim 1, further comprising a defocus amount acquisition unit which acquires, as a defocus amount, an amount of deviation of the focus detected by the second focus detection unit in the selected second focus detection area,
wherein the display area selection unit selects the second focus detection area, the defocus amount of which is less than a predetermined threshold, as the display area along with the focusing target area.

6. The imaging control device according to claim 1, wherein the first focus detection unit detects a focus more accurately than the second focus detection unit does.

7. The imaging control device according to claim 1, further comprising a focusing unit which performs a focusing operation in the first focusing target area.

8. An imaging apparatus comprising:
a first focus detection unit which detects a focus in a plurality of first focus detection areas;
a second focus detection unit which detects a focus in a plurality of second focus detection areas;
a focusing target selection unit which selects, from among the plurality of first focus detection areas, an area for focusing as a focusing target area on the basis of a detected result of the focus in the first focus detection areas;
a display area selection unit which selects, from among the plurality of second focus detection areas, an area for displaying as a display area along with the focusing target area on the basis of a detected result of the focus in the plurality of second focus detection areas;
a display control unit which causes a display unit to display the display area along with the focusing target area; and
an imaging unit which images an image including the display area.

9. A control method performed by an imaging control device, the method comprising:
a focusing target selection process in which a focusing target selection unit selects, from among a plurality of first focus detection areas in which a focus is detected by a first focus detection unit, an area for focusing as a focusing target area on the basis of a detected result of the focus in the first focus detection areas;
a display area selection process in which a display area selection unit selects, from among a plurality of second focus detection areas in which a focus is detected by a second focus detection unit, an area for displaying as a display area along with the focusing target area on the basis of a detected result of the focus in the plurality of second focus detection areas; and
a display control process in which a display control unit causes a display unit to display the display area.

* * * * *